Aug. 31, 1948.                R. M. BAKER                2,448,009
              INDUCTIVE HEATING OF LONGITUDINALLY
                       MOVING METAL STRIP
Filed Feb. 5, 1944                              2 Sheets-Sheet 2
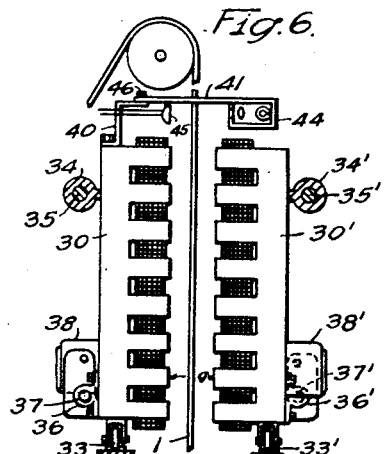
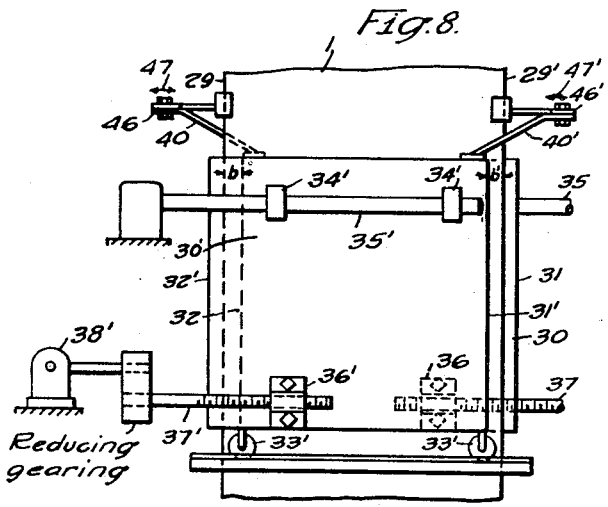
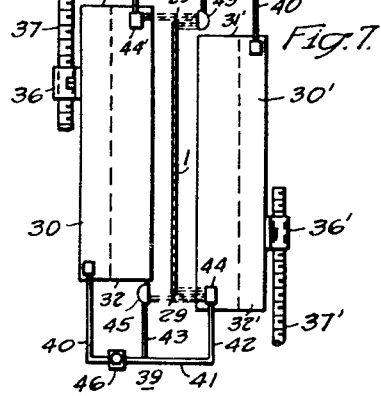
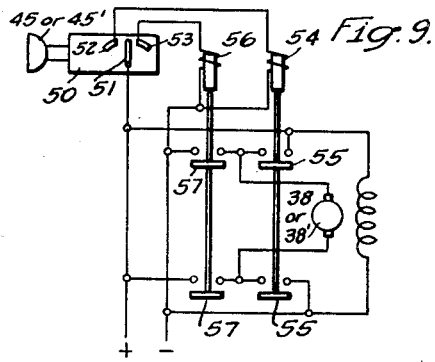
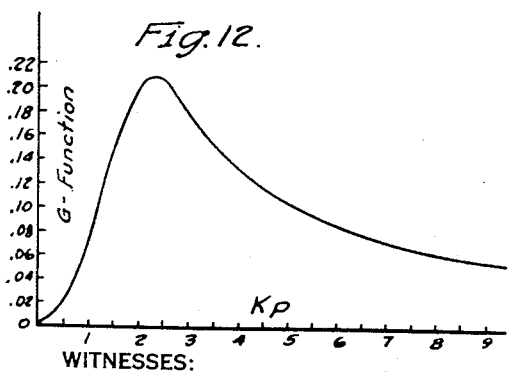
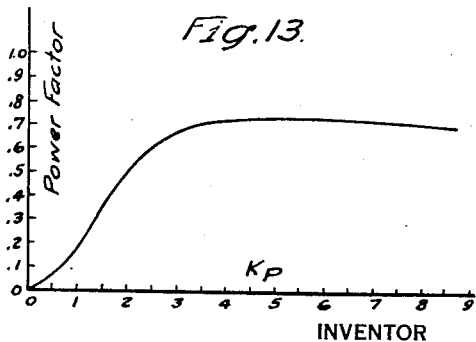
WITNESSES:                                INVENTOR
E. A. M°Closkey.                      Robert M. Baker.
Wm. C. Groome                              BY
                                      B. L. Zangwill
                                         ATTORNEY Patented Aug. 31, 1948

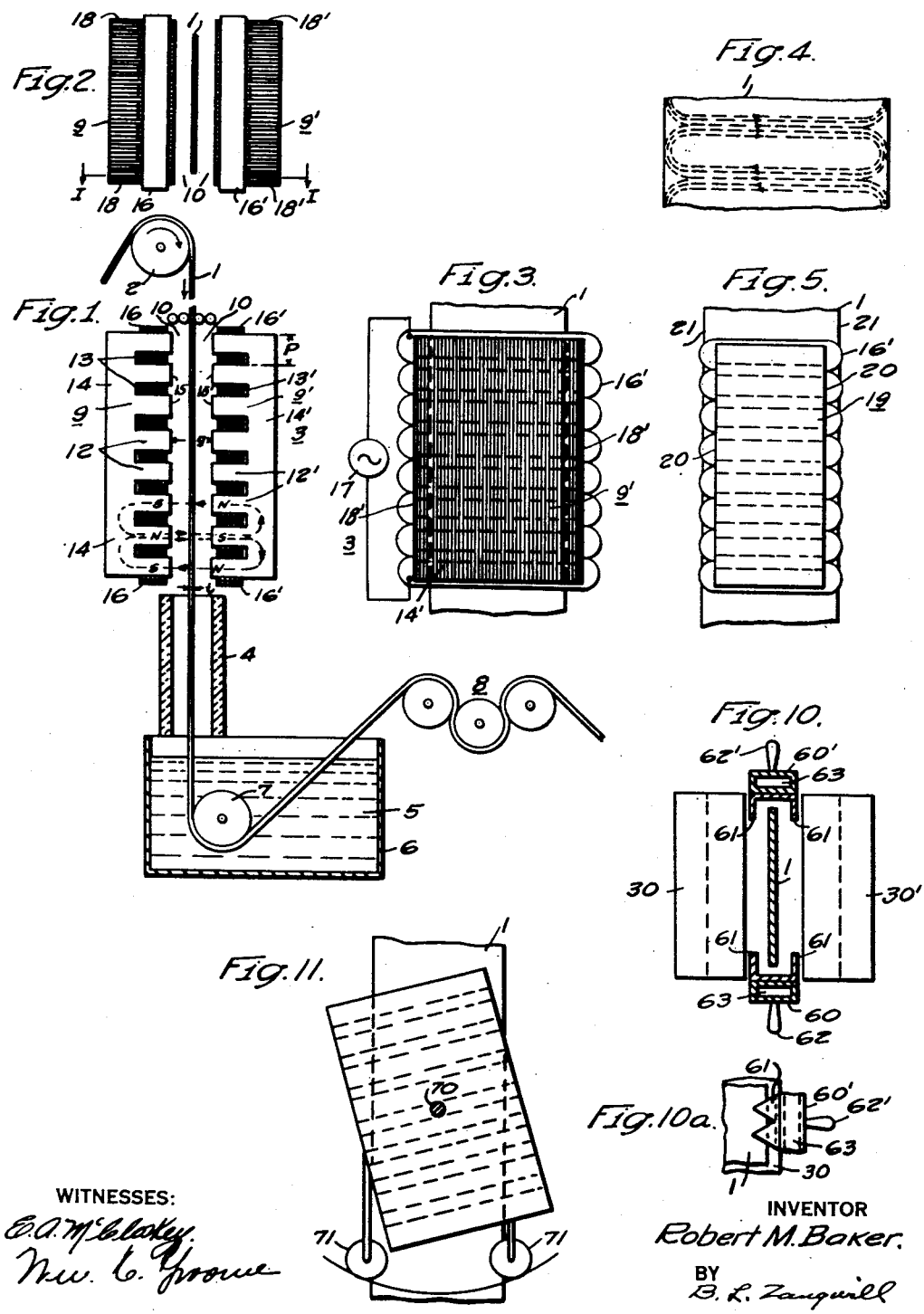

2,448,009

UNITED STATES PATENT OFFICE 2,448,009

INDUCTIVE HEATING OF LONGITUDINALLY MOVING METAL STRIP

Robert M. Baker, Pittsburgh, Pa., assignor to Westinghouse Electric Corporation, East Pittsburgh, Pa., a corporation of Pennsylvania Application February 5, 1944, Serial No. 521,229

27 Claims. (Cl. 219—13)

This invention relates, generally, to means and methods for heating electricity-conducting materials by electrical currents induced therein through the action of a magnetic field having flux-lines passing transversely through the material and changing with time relatively thereto; and more particularly relates to satisfactory and practicable heating of flat metallic material such as elongated strips, separated sheets or plates and the like, by causing the material to travel through a varying magnetic field in a direction transverse to the direction-lines of the field.

The electromagnetic induction of heat in metals is a well known phenomenon, and has attained an attractive measure of success in many heat-treating fields. However, as far as I am aware the use of transverse magnetic flux for heating, annealing or otherwise heat-treating metals, especially strip or the like, has not received an important degree of commercial acceptance because it has not been practicable and economical, with prior devices, to obtain satisfactory results.

It is an important object of my invention to satisfactorily heat travelling strip or similar material, especially thin strip, by inducing heating electric currents therein through the medium of transverse magnetic flux, by transverse meaning transversely across the length-dimension of the strip, that is, transverse to the direction in which the strip is travelling. In accordance with a preferred form of my invention, the magnetic flux lines pass through the strip in the direction of the strip-thickness, or substantially normal, or perpendicular, to the wide faces or sides of the strip.

It is a primary object of my invention to provide a furnace for heating moving elongated material, particularly strip, which is relatively much thinner than it is wide, by transverse flux and with a high degree of efficiency so that the size and character of the flux producing parts, including the field-structure, can be minimized or reduced to within economically practicable limits.

It is an important object of my invention to provide means and methods for heating moving elongated strip or similar material by transverse flux but in such manner that the heating will be uniform across the width of the strip within a utilizable range, so that buckling or warping of the strip is eliminated or reduced to tolerable or negligible proportions.

It is an object of my invention to provide transverse flux induction heating of a type described for both magnetic and non-magnetic materials such as iron strip and copper, aluminum, brass or other non-magnetic strip, respectively.

It is a general object of my invention to provide means and methods for the practicable heating, on a large tonnage basis, or travelling strip and similar materials by transverse magnetic flux.

It is an important object of my invention to provide a transverse magnetic flux induction heat-treating system for heating travelling strip and the like, which will satisfactorily heat the strip through the medium of a magnetic field that is changing its direction and intensity at a relatively slow rate, so that relatively low frequency power can be directly applied to the field-producing coils; the frequencies being in the order of that obtainable from common commercial power-lines or ordinary rotating high-power induction alternators or motor-generator sets. My invention also contemplates higher rates of alternations of the magnetic field, including frequencies obtained through resonant circuit apparatus such as spark-gap oscillators or tube-oscillators.

In accordance with one aspect of my invention, an induction heating system is provided which comprises flux-producing means in the form of a pair of laminated iron pole- or field-structures, each provided with a plurality of spaced teeth or poles having magnetizing coils, in effect, around them. The field-structures are arranged with their teeth facing so as to provide a narrow or shallow passage or air-gap through or into which the material can be continuously or otherwise passed for heating by magnetic induction. The magnetizing coils are so energized or placed that adjacent poles, laterally and longitudinally, have opposite polarities for providing the transverse magnetic flux which passes from a pole of one field-structure to a pole of the other field-structure. For keeping the size of the field-structures down and for providing efficient heating with a power-factor close to the maximum obtainable, my invention teaches the desirable relationship between physical factors involved in the heat-treatment.

A feature of my invention, which I consider of extreme novelty and importance in this application, resides in providing for more uniform heating of strip and like materials by controlling and adjusting the heating or current flow produced in the longitudinal edges or border-portions of the material, so as to limit or avoid warping, buckling or similar distortions which might otherwise occur if the heating across the strip were too uneven, or for any other reason. Specifically I accomplish this, in various embodiments, by having the flux which passes through the material of greater density or greater amount centrally of the strip than at the border-portions of the material along and embracing its extreme edges.

An important aspect of my invention resides in providing a single transverse flux induction heating furnace which can be utilized to heat various widths of different flat elongated materials such as metallic strip, in a manner aforesaid.

It is another object of my invention to provide a transverse flux induction heating furnace which will automatically adjust itself for uniformly heating a travelling material, the furnace having a field-structure or -structures which automatically follow the extreme edges of such material in case it should weave or move edgewise in the furnace.

Other objects, features, methods and innovations of my invention, in addition to the foregoing, will be discernible upon the following description thereof which is to be taken in connection with the accompanying drawings. The drawings are not to scale and in many of the figures details or parts are omitted or shown schematically for clarity of illustration and description. In the drawings, Figure 1 is a diagrammatic vertical sectional view, substantially on the line I—I of Fig. 2, of apparatus illustrating my invention applied to the heating of strip;

Figs. 2 and 3 are, respectively, a plan view and side elevational view of the induction heating means of the apparatus of Fig. 1;

Fig. 4 is a view for illustrating the manner in which I believe heating is caused in the strip;

Fig. 5 is a schematic side elevational view of a different embodiment of induction heating means for heating strip;

Figs. 6, 7 and 8 are schematic edgewise elevational, plan and side elevational views, respectively, of parts of still another embodiment of apparatus incorporating additional features of my invention;

Fig. 9 illustrates a control circuit which may be used for controlling the apparatus operating in accordance with that of Figs. 6, 7 and 8, but it is also applicable to other embodiments;

Fig. 10 is a schematic plan view of another embodiment of the induction heating means;

Fig. 10a is a partial detail side view of the embodiment of Fig. 10;

Fig. 11 is a schematic side elevational view of still another embodiment;

Fig. 12 is a curve indicating a "G" function by which the heating produced in a strip can be readily ascertained, the "G" function being ordinates and a factor $Kp$ the abscissae, and Fig. 13 is a curve representing as ordinates the internal power factor in the heating coil means for the induction heating furnace, and as abscissae the factor $Kp$.

Referring to the generalized showing in Figs. 1, 2 and 3 of an embodiment of my invention, a strip 1, to be inductively heated, passes over a roller 2 and then downward through an induction heating furnace indicated as a whole by the reference numeral 3, where the strip is inductively heated. It then passes out of the furnace 3, through a heat-insulated soaking chamber 4 of any suitable length, and into a quenching liquid 5 in a quench tank 6. The strip then passes around a roller 7, in the quench tank, and through a pull unit 8 which is power driven by any suitable power means properly controlled for pulling the strip 1 through its treatment-line. Such treatment-line may include a drag-unit, before the roller 2, for aiding in controlling the tension on the strip-span between the upper roller 2 and the lower roller 7, these rollers preferably being disposed so that the strip moves generally vertically. Additional apparatus for otherwise handling, controlling or treating the strip may be included in the treatment-line.

The furnace 3 comprises a pair of generally similar fixed field- or pole-structures 9 and 9', one on each side or face of the strip 1. In this embodiment, the air-gap between the field-structures provides a shallow but wide work-passage 10 through which the strip 1 passes between the field-structures, in the direction shown by the arrow in Fig. 1. In this embodiment the work-passage 10 also constitutes the air-gap between the field-structures.

In simplified and operable form each field-structure comprises a laminated magnetizable iron core comprising a plurality of alternating teeth and slots. In this description, corresponding parts of the field-structures are given the same reference numerals but for identification those associated with the field-structures 9' are all similarly primed. Thus, the core of the field-structure 9 has teeth or poles 12 separated by slots 13; and the core of the field-structure 9' has teeth or poles 12' separated by slots 13', the poles extending from common magnetic portions 14 and 14' of the cores, respectively. The poles 12 and 12' terminate in free pole-faces 15 and 15', respectively. The slots 13 and 13' receive any suitable magnetic flux producing means which may comprise one or more turns or conductors of copper wire or copper tubing, schematically shown as magnetizing coils 16 and 16' around each of the associated poles 12 and 12', there being as many windings or coils 16 and 16' as there are poles. Single-phase alternating current is used to energize the coils or windings 16 or 16' which are so connected and disposed on the slots 12 and 12' that the polarity of each pole at its free end, at any instant, is opposite to that of the adjacent pole or poles on the same field-structure and also is opposite to that of the pole located closest to it but which is on the other field-structure on the other side of the strip 1. This is indicated in Fig. 1 by the application of the letters N and S, respectively, to poles of opposite polarity; N indicating a north magnetic pole and S a south magnetic pole. However, it should be understood, as is known to those acquainted with electro-magnetic structures, that when the coils 16 and 16' are energized with alternating-current, as for example by a source of power 17, the magnetic polarity of each tooth or pole periodically reverses or changes from N to S and vice versa, in accordance with the frequency and phase of the currents passing through the coils.

In this particular embodiment, the magnetic flux at any instant can be considered to pass perpendicularly through the strip 1, going from the N-poles of each field-structure to the transversely opposite S-poles of the other field-structure, the flux-line paths being completed in the longitudinally continuous portions 14 and 14' of the cores. Such magnetic-paths are illustrated in Fig. 1 by the broken lines. Except for end poles, each north-pole receives part of the flux of an adjacent south-pole on the same field-structure; and the flux passing through each south-pole divides and goes to two adjacent north-poles. Considering the travel-path of the strip to be longitudinal, the flux passes through the strip transversely, as distinguished from flux which interlinks the strip longitudinally for heating in a manner such as described, for example, in my copending application, Serial No. 519,866, filed January 27, 1944 (now Patent No. 2,408,190, dated September 24, 1946). With transverse flux, the field-structures tend to attract each other, so that they should be suitably supported to prevent this attracting force from disturbing the positions in which it is desired to have them operate.

A particular furnace for transverse flux induction heating, including field-structures utilizable in accordance with the instant invention, is described in greater detail in the joint application of R. D. Reed, G. R. Monroe and myself, Serial No. 542,380, filed June 27, 1944.

The alternating or pulsating magnetic flux passing transversely through the strip 1 causes the strip to become heated. However, with field-structures having cores with lateral sides or core-edges 18 and 18' projecting beyond the extreme edges of strip 1, as shown in Figs. 2 and 3, the heating may be non-uniform across the width of the strip. My explanation for this non-uniform transverse heating, which I believe to be sound but to which I do not wish to be bound, is as follows: Referring to Fig. 4 and assuming that the transverse flux is all concentrated within the projected boundaries of the end surfaces or faces of a pair of aligned cooperating N and S poles on opposite sides of the air-gap 10, current will be induced in the strip 1 which interlinks the magnetic flux, the transverse current across the width of the strip flowing in the area aligned with the adjacent slots. Ideally the current loop should encompass the transverse area of the bundle of magnetic flux, but in a structure such as shown in Figs. 2 and 3, the current cannot flow beyond the extreme edges of the strip for externally interlinking the flux thereat and beyond, so that the current is probably more concentrated in the portion bordering the strip-edges, as indicated by the closer curved current lines in Fig. 4, resulting in greater heating in such border-portions of the strip, as compared to the heating in the central portion of the strip. This greater heating or concentration of the current in the border-portions of the strip occurs in the length of the strip-span in the magnetic field, creating a tendency for the strip to warp or otherwise distort; and it is an important part of my invention to avoid or mitigate such "edge-effect" or uneven heating across the strip.

Fig. 5 illustrates a modification which is useful for inductively heating strip of a single width while avoiding the aforesaid edge-effect. In this embodiment field-structures 19, along the lines of the previously described field-structures, of which that on one side of the strip only has been shown, are of lesser width than the strip itself. Preferably the core-edges 20 of the field-structures are equidistant from the extreme edges 21 of the strip. Such an embodiment has its most desirable use in connection with strips of the same width which can be fairly accurately positioned between the field-structures.

Figs. 6, 7, 8 and 9 illustrate a further embodiment, in accordance with my invention, in which each field-structure is automatically maintained a pre-set distance from one associated extreme edge 29 or 29' of the strip only, for minimizing the aforesaid "edge-effect" and attaining a more uniform heating across the strip. Referring to these figures the field-structures equivalent to the field-structures 9 and 9' are indicated at 30 and 30'. The field-structure 30 has vertical, or longitudinal, core-edges 31 and 32, and the field-structure 30' has vertical, or longitudinal, core-edges 31' and 32'. The field-structures, in this embodiment, have pole-lengths extending for a greater distance than the strip-width, but the core-edge 32 of the field-structure 30 and the core-edge 31' of the field-structure 30' are located laterally inside the associated extreme edges 29 and 29', respectively, of the strip 1; while the other core-edges 31 and 32', respectively, of the field-structures, project beyond the nearest strip-edges 29' and 29, respectively.

The field-structures 30 and 30' are supported in any suitable manner for displacement across the strip, with the air-gap distance, normal to the pole-faces, maintained constant. Such supporting and moving means has been symbolically shown as including a pair of rollers 33 rotatably secured to the field-structure 30 and a pair of rollers 33' for the field-structure 30', the rollers riding in any suitable stationary guide rails or tracks. Additional guiding means may be provided, such as sleeves 34 and 34', fastened to the respective field-structures, and externally-fixed guide rods 35 and 35' riding in the sleeves, for resisting the magnetic pull between the two field-structures. For moving the field-structure 30 laterally, an internally threaded nut or gear 36 is fastened thereto which meshes with a worm 37 driven through suitable reduction gearing, by a reversible motor 38. The field-structure 30' is moved laterally by a similar means comprising an internally threaded nut or gear 36' fastened thereto, the nut receiving a worm 37' driven through suitable reduction gearing by a reversible motor 38'.

The distance between a longitudinal core-edge of the field-structure and the associated strip-edge, for providing a greater uniformity of heating of the strip, can be found by experimentation for each strip size and material. This distance is indicated in Fig. 8 as b between the core-edge 32 of the field-structure 30 and the left-hand strip-edge 29; and as b' between the core-edge 31' of the field-structure 30' and the right-hand strip-edge 29'. Once this distance is established it is desirable to maintain it automatically so that weaving or similar movement of the strip in the direction of the width will not materially disturb the heat-treatment. Either one or both field-structures can be made to follow such displacement of the extreme edges of the strip. To this end each field-structure is provided with any suitable regulating means, responsive to the relative position of an extreme edge of the strip, for controlling the associated motor 38 or 38' so as to move the field-structure in a manner to maintain the distance b or b' substantially constant, that is, the longitudinal core-edge 32 of the field-structure 30 is made to follow displacement of the extreme left-hand edge 29 of the strip 1; and the longitudinal core-edge 31' of the field-structure 30' is made to follow any displacement of the extreme right-hand edge 29' of the strip 1, with reference to Fig. 8. Such regulating means comprises scanning means indicated at 39 and 39' for the respective field-structures 30 and 30'.

The scanning means 39 for the field-structure 30 comprises an arm-member 40 which is secured to this field-structure, and projects upwardly and outwardly beyond the top of this field-structure so as to clear the associated extreme left-hand edge 29 of the strip 1 and the top of the other field-structure 30'. The arm-member 40 comprises a bar 41 which spans the strip-edge 29, and two spaced arms 42 and 43 which extend from the bar 41 toward this strip-edge 29, on opposite sides thereof. The arm 42 supports a light beam source means 44, including a lamp, a lens and slot, which throws a parallel-ray beam of light onto a light- or photo-sensitive device 45 supported by the arm 43. An adjusting means 46 permits the bar 41 and the parts carried thereby to be moved in either direction laterally, that is, in line with the width-direction of the strip, as indicated by the two-headed arrow 47. Preferably, the bar 41 is adjusted so that about one-half of the light beam from the means 44 is intercepted by the strip 1 when the field-structure 30 is the desired distance b from the strip-edge 29. The scanning means 39' for the field-structure 30' comprises an arm-member 40' secured to the field-structure 30' for movement therewith, and a bar 41' from which project an arm 42' supporting a light beam source 44', and an arm 43' supporting a light-sensitive device 45'; an adjusting means 46' also being provided for increasing or decreasing the distance b', as indicated by the two-headed arrow 47'.

Each of the regulating means includes a control means for correspondingly controlling the associated motor 38 or 38'; and Fig. 9 shows a responsive motor-controlling means, it being understood that such a control means is provided for each field-structure. Assume that the control means is that for the field-structure 30. The control means comprises an amplifier 50 which amplifies the output of a light-sensitive device 45. When the distance between the strip-edge 29 and the field-structure edge 32 is the proper value b, the amount of light falling on the light-sensitive device 45 is such as to maintain a movable contact 51 in a neutral position between and out of contact with a pair of contacts 52 and 53. If a strip should weave so as to cut off more of the light beam reaching the light-sensitive device 45, indicating an increase in the displacement distance b or the space between the core-edge 32 of the field-structure and the strip-edge 29, the movable contact 51 engages the contact 52, completing a circuit to a relay 54. Energization of the relay 54 moves its contacts 55 to front, or closed, position for energizing the motor 38 so as to move the associated field-structure 30 toward the strip-edge 29, decreasing the blocking of the aforesaid light beam. As the field-structure 30 moves it carries with it the associated arm-member 40 so that the light beam thereof is moved to permit more of it to fall on the opposite light-sensitive device 45. As the amount of light reaching the light-sensitive device 45 increases the movable contact 51 tends to come closer to its neutral position and will reach this position when the adjustable longitudinal core-edge 32 of the field-structure 30 reaches the desired distance b from the associated strip-edge 29.

If the strip-edge 29 should move toward the associated longitudinal core-edge 32 of the field-structure 30, more than half of the light beam will reach the light-sensitive device 45 and the movable contact 51 will move to engage the stationary contact 53, energizing a relay 56. Energization of the relay 56 moves its movable contacts 57 to the front, or closed, position energizing a motor 38 or 38', but causing it to rotate in a direction opposite to that caused by closure of the contacts 55 which are under control of the stationary contact 52. Accordingly, the field-structure 30 will be moved in a direction to carry the light beam away from the strip-edge 29 so that more of it is gradually cut off until the movable contact 51 is restored to its neutral position in which both relays 54 and 56 are deenergized and the motor 38 stationary, indicating the proper distance b between the inside core-edge 32 of the field-structure and the strip-edge 29. The control means provided for the other field-structure operates in a like manner.

If it is desired to increase the distance b or b', it is obvious that the adjusting means 46 or 46' can be operated so as to move the bar 41 or 41' outwardly away from the strip-edge, and vice versa. Preferably the light-sensitive devices should be positioned sufficiently in advance of the field-structures so that the motors 38 and 38' will adjust the field-structure or structures by the time the portion of strip which acted on the light beam has reached the heat-treating zone. Weaving of a strip and variations in its width are usually so gradual that high-speed extremely sensitive regulation is not necessary.

The embodiment described in connection with Figs. 6, 7 and 8 decreases the flux interlinking or passing through the border-portions of the strip by displacement of the field-structures; but in Fig. 10 another embodiment is disclosed in which adjustable shields or screening means 60 and 60' are provided at the border-portions of the metal strip 1. Each shield may correspond in length to the longitudinal length of the field-structures, and comprises a screen-member in the form of a relatively narrow thin metal bar 61 between each strip-edge and each field-structure. Handles 62 are provided for adjusting the position of the shields so that more or less of the magnetic flux at the border-portions of the strip can be prevented from passing therethrough because of the demagnetizing ampere turns produced by the induced circulating currents in the screen-members 61. Preferably these screen-members 61 are of copper and cooling means may be provided in the form of a hollow tube 63 through which water may be passed for carrying away the heat generated in the screen-members 61. A shielding or screening means and temperature responsive system for controlling heat inductively produced by magnetic flux in a workpiece are described and claimed in my copending application Serial No. 513,260 filed December 7, 1943. If desired the extreme edges of each screen-member 61 may be serrated as shown in Fig. 10a so that a small adjustable amount of flux can penetrate through to the border-portions of the strip, this amount obviously being less than that which can pass through central unshielded portions of the strip. My copending application Serial No. 553,381, filed September 9, 1944, describes and claims a transverse flux induction heating furnace comprising a screening means, and includes an embodiment such as shown in Figs. 10 and 11 of the instant application.

In Fig. 11 I disclose still another embodiment of my invention for causing the magnetic flux passing through the central portion of the strip to be less than that at the border-portions. In this embodiment the field-structures are mounted for a rotation on individual shafts 70 and rollers 71, but so that the air-gap between them is maintained constant. It is apparent that the border-portions of the strip will pass through a magnetic field which is of less longitudinal length than that along the central portions of the strip, depending on the angle through which the field-structure is turned.

A particular advantage of the embodiments of Figs. 6 through 11 resides in the fact that the induction furnace means is made adaptable to any width or kind of strip provided the field-structures are about as wide or wider than the widest strip expected to be inductively heated. This is because the distance $b$ or $b'$, and the equivalent adjustments for the other embodiments, can be accommodated and changed to the particular strip which is being heat-treated. Once the adjustment is reached a regulating means such as described in connection with the embodiment of Figs. 6, 7 and 8 will maintain this adjustment with variations in the position of the strip-edge that are generally bound to occur in practical apparatus and with utilizable strip speeds.

My invention is especially useful for heating nonmagnetic strip. With magnetic strip the strip may tend to move out of central position by leakage flux acting to pull it against a pole face so that inordinate tensions on the strip may be required as it passes through the furnace between the field-structures. However, leakage flux tends to cause nonmagnetic strip to assume a position of equilibrium between the field-structures.

In general, the speeds of the strip will be relatively low compared to the frequency with which the magnetic flux alternates and the distance between poles, although it is conceived that the strip speeds may eventually become so high as to be a factor in the heating. Some heating can be obtained with high strip speeds and a substantially non-varying unidirectional flux in the field-structures.

In general, magnetic permeability is a factor in magnetic induction heating but in heating with transverse flux as described herein, a magnetic strip is not heated appreciably greater than a non-magnetic strip, as the strip thickness is small in comparison to the air-gap. This is because a small distance of air-gap introduces so great a magnetic reluctance that the strip has little effect on the total reluctance for the magnetic path.

The induced heating in each cubic centimeter of a non-magnetic strip due to transverse flux alternations therethrough can be mathematically expressed with close approximation if the lines of flux are considered concentrated between the pole-faces of cooperating N and S poles on opposite sides of the strip, which will be the case where the air-gap is small in comparison to the pole-pitch; a ratio of 1 to 4 or more being suitable.

Such heating in each cubic centimeter of strip subjected to the flux alternations can be expressed as (1) $$W = \frac{gH^2 f G(Kp) 10^{-7}}{2t}$$

watts per cubic centimeter where $g$=air-gap in centimeters; $H$=peak magnetizing force in the air-gap without strip therein, expressed in oersteds; $f$=frequency in cycyles per second; $t$=thickness of strip in centimeters; and $G$ is a complex function of the product of $K$ and $p$, where (2) $$pK = p\sqrt{\frac{4\pi^2 f t 10^{-9}}{rg}}$$

$p$ being the pole-pitch in centimeters, and $r$ the resistivity of the strip in ohm-centimeters.

For a symmetrical arrangement such as shown in Figs. 1–8 where the field-structure core-edges are substantially the same distance from the strip-edges, and the pole-face area is the same as the cross-section of a pole, the total wattage induced by the alternating flux can be represented as (3) $$W_t = A t n W$$

where $A$ is the projected area in square centimeters of a single pole on the strip and $n$ is the number of poles in a single field-structure, having flux passing through the strip.

Figure 12 shows the G function, and in general it has a maximum in the neighborhood of $Kp=2.25$, the G function decreasing rapidly as the product of $Kp$ decreases below about 2.25, decreasing gradually as the value increases above 2.25, and leveling off with higher values of $Kp$.

The internal power factor at which the induction heating-coils or windings 16 and 16', or the equivalent, would operate if there were no magnetic leakage and no resistance loss in the windings is also a function of $Kp$; and Fig. 13 shows how the internal power factor of the heating-coil varies therewith. Leakage tends to decrease and heat losses in the field-structure to increase this power factor. Apparently the maximum internal power factor obtainable is about .707 and has practically reached this value for a value of $Kp$ not far from that which gives a maximum G function, or maximum heating, other things being the same.

If the leakage is low, as it should be in a good design, $Kp$ may be increased appreciably above 2.25 without sacrificing much in heating efficiency or in power factor. The value of $Kp$ should not, however, be significantly less than 2 if the costs of the apparatus and its operation are to be kept down. As the value of $Kp$ increases the effects of magnetic leakage and heat losses in the field-structures become more apparent, and the actual power factor across the power supply lines to the field-structures reaches a maximum when $Kp$ is in the neighborhood of 3, and then begins to decrease as $Kp$ increases above this value. A satisfactory range for the value of $Kp$ is between 2 and about 6, or somewhat more, for most effective heating when considered from the standpoint of efficiency and power factor, if the size and costs of the apparatus are to be kept close to a minimum.

From Formula 2, for $Kp=2$, $p^2f$ is about $$\frac{rg}{t}10^8$$

and for $Kp=6$, $p^2f$ is about $$\frac{rg}{t}10^9$$

within allowable discrepencies. Accordingly it is desirable, in building and using transverse induction heating of a type described, to make (4) $$\frac{rg}{t}10^9 > p^2 f > \frac{rg}{t}10^8$$

To stay within this relationship, it is desirable to use smaller pole-pitches with higher frequencies, and larger pole-pitches with lower frequencies, other factors being equal.

In general, for obtaining a small size of field-structure, the pole-width to pole-pitch ratio should be preferably 3/4 or more, that is, a pole should be at least 3 times as wide as a slot. These are not, however, essential proportions, or even necessary proportions; but if the proportion is greater than 3 to 1 for pole width to slot width, it may not be possible to include sufficient copper to carry the current for producing the desired magnetizing force with reasonable copper heat losses, and if the proportion is appreciably less, the heat inducing flux, passing through the strip, will be too low.

Usually, however, a large pole-width is desirable, especially if the air-gap between field-structures is large. Induced current flow is concentrated under the slots so that the heating is effected to some extent if a slot is made too wide; and to be safe, it should be only large enough to receive the desired quantity of copper for the current input to the induction furnace.

Reasonably uniform field-structure assembly is readily obtainable in practice, and in such case the movement of the strip and the plurality of poles equalizes the non-uniformity of heat generated in the direction of the strip-travel because each element of strip, along the length of the strip, is subjected to the same variations in heating, irrespective of the speed of the strip.

The air-gap should be as narrow as possible while providing sufficient clearance so that the material will not rub against the pole faces. This means that some allowance must be made for lashing of the strip which is sometimes appreciable if the strip span through the furnace, between the nearest rollers, is long. To avoid serious fringing or leakage flux, the air-gap should be not more than about one-fourth of the pole width, so that flux will pass from one field-structure to the other, rather than between adjacent poles of the same field-structure.

The total power required to be put into a strip will depend on the physical properties of the strip, its speed of travel through the furnace, and the difference between its entering and leaving temperatures.

As illustrating the application of my invention, the following two examples are recited. Assuming it is desired to inductively heat an iron sheet or strip having a thickness of .01 inch or .0254 centimeter, a resistivity of $110 \times 10^{-6}$ ohms-centimeters in a transverse flux induction furnace having an air-gap $g$ of 2 centimeters between its field-structures. Assume a pole-pitch of 12 centimeters. Since it is desirable to make $Kp$ in the neighborhood of 2.50, substituting this value in Equation 2 and solving for $p\sqrt{f}$, a value of 1170 is obtained. With a pole-pitch of 12 centimeters, a frequency of 9600 results. This yields a suitable combination of pole-pitch and rotating machine frequency for heating the strip. Substituting in Equation 4, it is found that $p^2f$ is within the limits specified so that the power factor will be in an acceptable range.

Assume it is desired to heat this iron strip from 750° C. to 1000° C. while it is moving 400 feet per minute through three feet of transverse magnetic flux. Taking the specific heat of the strip to be .16 and its density 7.6 grams per cubic centimeter, it can be shown that the wattage required to heat the strip would be 2920 watts per cubic centimeter. With the assumption that $Kp=2.5$, the G function from Fig. 12 is .2. Substituting in Formula 1 and solving for H, a value of 623 oersteds is obtained. This is a relatively low magnetizing force which can be obtained without difficulty in a transverse flux field-structure of the type described.

As another example, assume that aluminum sheet .104 centimeter thick, having a resistivity of $4.85 \times 10^{-6}$ ohm-centimeters, is to be raised from room temperature to 350° C. in a transverse flux induction furnace having a 2 centimeter air-gap. Again for sufficient heat with high power factor, $Kp$ can be assumed to be 2.5. With the pole-pitch of 12 centimeters as found for iron, it will be found that $p\sqrt{f}=123$ and $f=104$ cycles. This is a low value as compared to the frequency of 9600 cycles found desirable for heating the thinner iron sheet. In fact this frequency is so low as to suggest that the heating might be accomplished at commercial frequencies of 60 cycles. With this frequency the pole-pitch should be about 16 centimeters which is not too large. The watts per cubic centimeter for heating this aluminum strip from a room temperature of 25° C. is about 215 watts and the magnetizing force required from Equation 1 is 4270 oersteds. While this appears to be somewhat high for higher frequencies, it is quite practical at 60 cycles. Although a somewhat higher frequency has been indicated for heating the aluminum sheet, the saving in frequency conversion equipment would make the use of 60 cycles attractive.

While I have described my invention in different forms and with several applications, it is evident that my invention is general and fully teaches the practical use of transverse flux induction heating for heating travelling metals of different kinds. Accordingly, I desire that the attached claims be given their broadest interpretation, limited only by the prior art.

I claim as my invention:

1. Induction furnace means of a type described including a relatively wide and shallow work-passage and means for longitudinally passing travelling work-material, such as strip, through said work-passage, said induction furnace means comprising flux producing means for providing transverse flux across said work-passage, said flux producing means including a magnetizable core having a longitudinal core-edge, supporting means for movably supporting said core, and means operable while work-material is passing through said work-passage in order to be inductively heat-treated, for moving said core for varying the position of said core-edge while maintaining the depth of said work-passage substantially constant.

2. Induction furnace means of a type described including a relatively wide and shallow air-gap of substantially uniform depth for receiving flat work-material, such as strip, travelling longitudinally, said induction furnace means comprising flux producing means for providing transverse flux across said air-gap, said flux producing means including a magnetizable core having a longitudinal core-edge, means for supporting said core for substantially rectilinear lateral movement while maintaining the depth of said air-gap substantially constant, and regulating mechanism for moving said core.

3. Induction furnace means of a type described including a relatively wide and shallow work-passage in which travelling work-material, such as strip, is heated while passing through said work-passage, said induction furnace means comprising flux-producing means for providing transverse flux across said work-passage, said flux producing means including a magnetizable core having a core-edge, means for supporting said core for movement, means comprising a motor operable for moving said core, and means comprising a light source and a light-sensitive device, at least one of which is associated with said core, for operating said core-moving means.

4. Induction furnace means of a type described including a relatively wide and shallow work-passage and means for passing travelling work-material, such as strip, longitudinally through said work-passage, said induction furnace means comprising flux producing means for providing transverse flux across said work-passage, said flux producing means including a magnetizable core having a core-edge, means for supporting said core for substantially rectilinear movement while maintaining the depth of said work-passage substantially constant, and means for moving said core-edge to different positions laterally of said work-passage automatically in response to displacements of the position of an edge of the work-material entering the work-passage.

5. Induction furnace means including a flat relatively wide and shallow work-passage open at a pair of opposite ends for receiving metallic strip and the like, a field-structure on each side of said work-passage, said field-structures being separated a distance $g$, in centimeters, and each comprising alternating poles and slots, and means for magnetizing said poles so as to provide a transverse magnetic flux across said work-passage, the last said means comprising current-carrying conductors and an alternating-current power source therefor, said poles and slots having a pole-pitch $p$, in centimeters, and said power-source being set to operate with an alternating current of frequency $f$, in cycles per second, such that $$10^9 \frac{rg}{t} > p^2 f > \frac{rg}{t} 10^8$$

where $r$ is the resistivity of the material to be treated in ohm-centimeters, and $t$ is its thickness in centimeters.

6. The invention of claim 5 characterized by the poles having a width which is at least three times the slot-width.

7. Induction furnace means comprising a pair of facing electromagnetic field-structures spaced to provide an air-gap there-between through which elongated substantially flat metallic material may be continually longitudinally passed, each of said field-structures comprising a core having a plurality of alternating poles and slots, and conductors in said slots adapted, when carrying electric current, to produce magnetic flux in said poles, with the flux path passing transversely across said air-gap, said field-structures having their opposite pole-faces substantially uniformly spaced, the pole-faces of each field structure lying substantially in a plane, each of said cores having a longitudinal core-edge, and means for supporting said cores for separate movement, during operation of said induction furnace means, for changing the amount of flux at the longitudinal edges of the material being heated, in accordance with changes in the width of the material.

8. Induction furnace means comprising a plurality of facing electromagnetic field-structures having substantially directly opposite cores spaced to provide an air-gap therebetween through which elongated substantially flat metallic material may be continually longitudinally passed, said cores comprising a plurality of alternating poles and slots, extending along the width of the air-gap, and conductors in said slots adapted, when carrying electric current, to produce magnetic flux in said poles, passing transversely across said air-gap, means for supporting said cores so that they are laterally displaceable, and means comprising a motor for each core, for separately moving said cores during operation of said induction furnace means.

9. Induction furnace means comprising a plurality of facing electromagnetic field-structures spaced to provide an air-gap space through which elongated substantially flat metallic material, such as strip, may be continually passed, said field-structures comprising a plurality of alternating poles and slots, extending substantially completely across the width of said air-gap space, and conductors in said slots adapted, when carrying electric current, to produce magnetic flux in said poles, means for guiding said elongated metallic material through said air-gap space with an extreme edge of said material free in said air-gap space, said field-structures having their opposite pole-faces substantially uniformly spaced, and providing, when magnetized, a flux extending from one of said opposite pole-faces to the other, and regulating means for maintaining the lateral distance between a longitudinal edge of at least one of said field-structures and said edge of the material substantially constant as the material passes through said furnace means.

10. Induction furnace means comprising a plurality of facing electromagnetic field-structures spaced to provide an air-gap space through which elongated substantially flat metallic material, such as strip, may be continually passed, said field-structures comprising a plurality of alternating poles and slots, and conductors in said slots adapted, when carrying electric current, to produce magnetic flux in said poles, means for guiding said elongated metallic material through said air-gap space with at least one extreme edge of said material free in the air-gap space, said field-structures having their opposite pole-faces substantially uniformly spaced, and providing a flux path passing transversely across the air-gap, and means for adjustably moving at least one of said field-structures while material is passing through said furnace means for following changing positions of a longitudinal line of said material, the last said means comprising a light-source and light-sensitive device for scanning said line of the material.

11. Induction furnace means comprising a plurality of facing electromagnetic field structures spaced to provide an air-gap through which elongated substantially flat metallic material, such as a strip, may be continually longitudinally passed, said field-structures comprising a plurality of alternating poles and slots, extending across the width of said air-gap, and conductors in said slots adapted, when carrying electric current, to produce magnetic flux in said poles, means for guiding said elongated metallic material through said air-gap with at least one extreme edge of said material free in said air-gap, regulating means for maintaining the lateral distance between a point on one of said field-structures and an extreme edge of said material substantially constant as the material passes through said furnace means, and means for adjusting the distance to be maintained by said regulating means.

12. Induction furnace means comprising a plurality of upstanding facing electromagnetic field-structures spaced to provide an upstanding air-gap, said field-structures comprising a plurality of alternating poles and slots, and conductors in said slots adapted, when carrying electric current, to produce magnetic flux in said poles, which passes transversely across said air-gap, said field-structures having their opposite pole-faces substantially uniformly spaced, the pole-faces of each field-structure lying substantially in a plane, means for guiding elongated strip for movement substantially vertically through said air-gap with one of its extreme edges free therein, means for supporting at least one of said field-structures for rectilinear horizontal movement but so as to maintain the normal distance between said field-structures substantially constant, and means in fixed distance-relation to said one field-structure, for controlling the movement of said one field-structure in accordance with variations in the position of said one extreme edge.

13. Induction furnace means including a flat relatively wide and shallow work-passage open at a pair of opposite ends through which elongated metallic strip and the like are adapted to be passed, a field-structure on each side of said work-passage, said field-structures comprising magnetizing means for producing a transverse magnetic flux across said work-passage, separate moving means for each field-structure, an arm-member projecting from each field-structure, and means on each of said arm-members, operable on the moving means of the associated field-structure, for controlling the position of the associated field-structure, said arm-members being at opposite sides of said work-passage.

14. Induction furnace means including a relatively wide and narrow work-passage open at a pair of opposite ends through which elongated metallic strip and the like are adapted to be passed, a field-structure on each side of said work-passage, magnetizable for producing a transverse magnetic flux across said work-passage, said field-structures comprising a plurality of alternating parallel poles and slots, said poles and slots being slanted with respect to the width-direction of said work-passage.

15. An induction furnace for inductively heating strip, comprising an electromagnetic field-structure having a substantially planar face for transverse flux passing therethrough, means for continually passing strip substantially parallel to said face with a strip-edge substantially free alongside said face, means for supporting said field-structure for movement in a direction substantially parallel to its said face, and means for controlling the movement of said field-structure in accordance with the position of strip being passed into association with said field-structure face.

16. An induction furnace for inductively heating strip, comprising an electromagnetic field-structure having a substantially planar face for transverse flux passing therethrough, means for continually passing strip alongside said face, means for supporting said field-structure for movement in a direction substantially parallel to its said face, means controllable for moving said field-structure, an arm-member projecting from said field-structure in the direction from which the strip is fed, and means comprising responsive means on said arm-member, for controlling said controllable means for moving said field-structure.

17. A device of the class described comprising in combination, an electromagnetic field-structure, an arm projecting from said field-structure, and a light-sensitive device supported by said arm at a distance away from said field-structure.

18. A device of the class described, comprising in combination, an electromagnetic field-structure, an arm projecting from said field-structure, a light-device supported by said arm at a distance away from said field structure, and means for adjusting the distance of said light-device from said field-structure.

19. A method of heating flat metal of thickness $t$ in centimeters and resistivity $r$ in ohm-centimeters, in an induction furnace having an air-gap of depth $g$ formed between electromagnetic field-structures having a plurality of alternating poles and slots of pole-pitch $p$ in centimeters, which comprises magnetizing said field-structures for providing alternating transverse flux across the air-gap, with alternating current having a frequency $f$ such that $$\frac{rg}{tp^2}10^9 > f > \frac{rg}{tp^2}10^3$$

and passing the strip through the air-gap at a rate subjecting each portion of the strip to several alternations of flux while passing a pole-pitch distance, $g$ being in centimeters and $f$ in cycles per second.

20. Induction heating apparatus of a type described comprising a pair of field-structures having opposite cores spaced to provide an air-gap of substantially uniform depth therebetween, said pair of field-structures comprising electromagnetic means for providing a transverse magnetic flux in said air-gap, means for passing strip longitudinally through said air-gap with a border-portion of the part of the strip in the air-gap being free to occupy different positions therein, and means for initiating a change in the action of the transverse flux on a strip border-portion when the position of a portion of the strip entering said air-gap changes.

21. Induction heating means of a type described comprising, in combination, a pair of field-structures having substantially planar faces, supporting means for supporting said field-structures with their faces substantially parallel and vertically directed and spaced to provide a relatively wide and relatively shallow air-gap, said field-structures comprising electromagnetic means energizable to provide a transverse flux in said air-gap between said pole-faces, means for causing substantially flat work-material to pass through said air-gap substantially parallel to said pole-faces, and means for separately regulating the sidewise position of said field-structures during passage of said work-material therebetween.

22. Induction heating means of a type described comprising, in combination, a pair of facing electromagnetic field-structures spaced to provide an air-gap therebetween through which elongated substantially flat metallic material having longitudinal extreme edges may be continuously longitudinally passed with said edges in said air-gap, said field-structures comprising a plurality of alternating poles and slots and conductors in said slots adapted, when carrying electric current, to produce magnetic flux in said poles, said poles and slots extending substantially completely across the width of said air-gap, means for guiding said elongated metallic material through said air-gap with said edges free therein, and means for adjustably moving at least one of said field-structures while said material is passing through said air-gap, in a predetermined manner dependent upon the position of the material entering said air-gap.

23. Induction heating means comprising a plurality of field-structures spaced to provide an air-gap of substantially uniform depth through which substantially flat elongated metallic material may be continually longitudinally passed with an edge being free to occupy different positions laterally in said air-gap, said field-structures comprising core-means and means for magnetizing said core-means to provide a magnetic flux extending transversely across the air-gap, and regulating means for maintaining a point on said core-means in a predetermined distance-relation to a longitudinal line of the material, while the material is passing through the induction heating means.

24. Induction heating means of a type described comprising a plurality of field-structures spaced to provide a work-passage providing a path through which flat material having length and width can be progressively longitudinally passed for inductive heat-treatment, said field-structures comprising flux-producing means for providing magnetic flux transversely across said work-passage, said flux-producing means having means associated therewith for causing different amounts of magnetic flux at different points along the width of said path while material is moving along the path, and regulating means for the last said means for changing the relative amounts of magnetic flux at said different points while maintaining the depth of said work-passage substantially constant across its width.

25. Induction heating means of a type described comprising a plurality of field-structures spaced to provide an air-gap between directly opposite faces of said field-structures, through which flat material having length and width can be progressively longitudinally passed for inductive heat-treatment, said field-structures comprising flux-producing means for providing magnetic flux transversely across said air-gap, said flux-producing means having means associated therewith for causing different amounts of magnetic flux at different points along the width of said air gap, and means including controlling means operable in a manner responsive to the relative position of a field-structure with respect to the moving material, for changing the relative amounts of magnetic flux at said different points without any significant change in the depth of said air-gap at any point thereof.

26. Induction heating means of a type described comprising a plurality of field-structures spaced to provide an air-gap through which elongated material may be continually longitudinally passed with the moving material being free to occupy different positions in the air-gap, said field-structures comprising core-means for providing a magnetic field with flux extending transversely across the air-gap, and field-affecting means for changing the distribution of flux laterally across part of the air-gap in accordance with the lateral position of a portion of the moving material.

27. Induction heating means including a flat relatively wide and shallow work-passage open at a pair of opposite ends for receiving metallic strip and the like, having a resistivity $r$, in ohm-centimeters, and a thickness $t$, in centimeters; core-means comprising a core on each side of said work-passage, said cores having substantially parallel faces separated a distance $g$, in centimeters; said core-means comprising alternating poles and slots, having a pole-pitch $p$, in centimeters; and means for magnetizing said cores with a magnetic flux pulsating at a frequency $f$, in cycles per second, such that $$\frac{rg}{t}10^9 > p^2 f > \frac{rg}{t}10^8$$

ROBERT M. BAKER.

REFERENCES CITED

The following references are of record in the file of this patent:

UNITED STATES PATENTS

| Number | Name | Date |
|---|---|---|
| 1,912,214 | Northrup | May 30, 1933 |
| 1,932,423 | Sessions | Oct. 31, 1933 |
| 1,937,420 | Wood et al. | Nov. 28, 1933 |
| 1,997,272 | Adams | Apr. 9, 1935 |
| 2,003,136 | Caputo | May 28, 1935 |
| 2,064,589 | Convers | Dec. 15, 1936 |
| 2,209,637 | Sessions | July 30, 1940 |

OTHER REFERENCES

Lawrence: "Principles of Alternating Current Machinery," second edition, seventh impression, 1921; McGraw-Hill Book Co., Inc., New York city; page 80.